United States Patent
Peng

(10) Patent No.: US 9,807,832 B1
(45) Date of Patent: Oct. 31, 2017

(54) LIGHT EMITTING DIODE DRIVING SYSTEM WITH FAST VOLTAGE-ADJUSTING CIRCUIT

(71) Applicant: Semisilicon Technology Corp, New Taipei (TW)

(72) Inventor: Wen-Chi Peng, New Taipei (TW)

(73) Assignee: SEMISILICON TECHNOLOGY CORP., New Taipei (TW)

( * ) Notice: Subject to any disclaimer, the term of this patent is extended or adjusted under 35 U.S.C. 154(b) by 0 days.

(21) Appl. No.: 15/422,970

(22) Filed: Feb. 2, 2017

(30) Foreign Application Priority Data

Sep. 26, 2016 (TW) .............................. 105214723 U

(51) Int. Cl.
*H05B 33/08* (2006.01)

(52) U.S. Cl.
CPC ................................ *H05B 33/0842* (2013.01)

(58) Field of Classification Search
CPC .................................................. H05B 33/0842
USPC ........................................................ 315/201
See application file for complete search history.

(56) References Cited

U.S. PATENT DOCUMENTS

| | | | | |
|---|---|---|---|---|
| 9,380,662 B1* | 6/2016 | Peng | ................... | H05B 33/0818 |
| 9,510,409 B2* | 11/2016 | Peng | ................... | H05B 37/0263 |
| 9,572,214 B1* | 2/2017 | Peng | .................... | H05B 33/083 |
| 2017/0094734 A1* | 3/2017 | Hariman | ............ | H05B 37/0281 |

* cited by examiner

*Primary Examiner* — Dylan White
(74) *Attorney, Agent, or Firm* — Chung-Ming Shih; HDLS IPR Services

(57) ABSTRACT

A light emitting diode driving system includes a control unit, an output side switch unit, the fast voltage-adjusting circuit and a light signal voltage generation circuit. When the control unit does not turn on the output side switch unit, the control unit controls the fast voltage-adjusting circuit to process an output voltage, and the light signal voltage generation circuit combines the fast voltage-adjusting circuit to clamp the output voltage to meet a predetermined value. When the output voltage is processed to meet the predetermined value, the control unit turns on the output side switch unit so the output voltage recovers and a light driving signal is generated. According to the light driving signal, a plurality of two-pin point-controlled light emitting diode lamps is operated in a lighting mode.

11 Claims, 10 Drawing Sheets

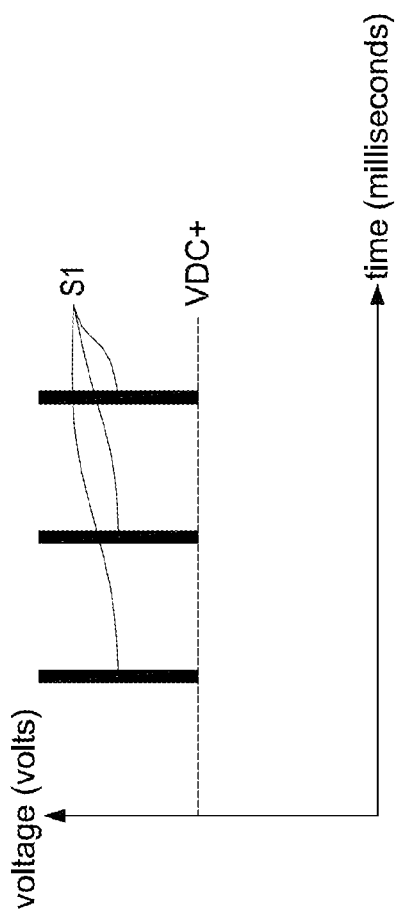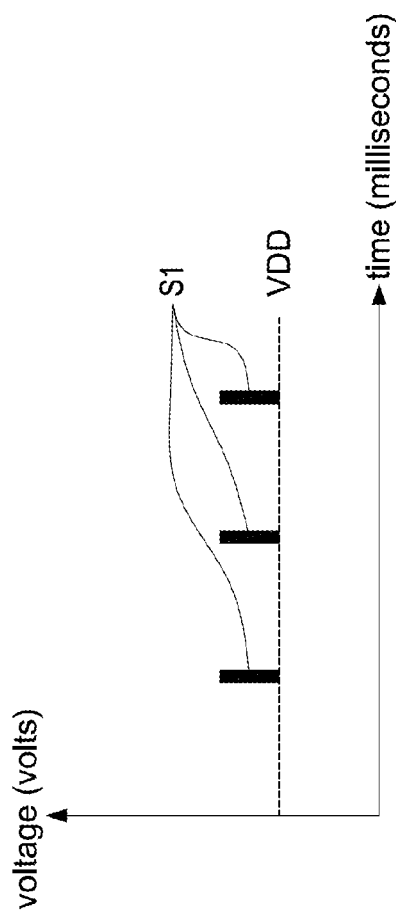

LIGHT EMITTING DIODE DRIVING SYSTEM WITH FAST VOLTAGE-ADJUSTING CIRCUIT

BACKGROUND OF THE INVENTION

Field of the Invention

The present invention relates to a light emitting diode driving system, and especially relates to a light emitting diode driving system with a fast voltage-adjusting circuit.

Description of the Related Art

A related art light emitting diode driving system is a very common electronic apparatus. The related art light emitting diode driving system generates a light driving signal and sends the light driving signal to a plurality of light emitting diode lamps to drive the light emitting diode lamps to light. Therefore, the related art light emitting diode driving system is very important.

The light driving signal generated by the related art light emitting diode driving system usually comprises a plurality of pulse waves. The pulse waves comprise high voltages and low voltages. Currently, a disadvantage of the related art light emitting diode driving system generating the pulse waves is that a speed for generating the high voltages or the low voltages by the related art light emitting diode driving system is not fast enough, so that the light driving signal is incorrect easily.

FIG. 6 shows a waveform diagram of an embodiment of the related art light driving signal. For the related art light emitting diode driving system generating the low voltage, the related art discharging circuit processes the discharging task with deducting an equivalent capacitance of a plurality of the related art two-pin point-controlled light emitting diode lamps and with the related art light signal voltage generation circuit. Therefore, in the same output switch conduction time t, the output voltage is not discharged to the predetermined voltage (60 volts as shown in the Fig.), but the output voltage goes back (namely, recovers) to 110 volts. The waveform moving down in FIG. 6 is for discharging (a little bit curved), and then the waveform is back to 110 volts because the voltage recovers.

SUMMARY OF THE INVENTION

In order to solve the above-mentioned problems, an object of the present invention is to provide a light emitting diode driving system with a fast voltage-adjusting circuit.

In order to achieve the object of the present invention mentioned above, the light emitting diode driving system drives a plurality of two-pin point-controlled light emitting diode lamps. The light emitting diode driving system comprises a control unit, an output side switch unit, the fast voltage-adjusting circuit and a light signal voltage generation circuit. The output side switch unit receives and sends an output voltage. Namely, the output side switch unit receives the output voltage and then the output side switch unit sends out the output voltage. The output side switch unit is electrically connected to the control unit and the two-pin point-controlled light emitting diode lamps. The fast voltage-adjusting circuit is electrically connected to the control unit, the two-pin point-controlled light emitting diode lamps and the output side switch unit. The light signal voltage generation circuit clamps the output voltage. The light signal voltage generation circuit is electrically connected to the control unit, the output side switch unit and the fast voltage-adjusting circuit. Moreover, the control unit controls a conducting state of the output side switch unit. When the control unit does not turn on the output side switch unit, the control unit controls the fast voltage-adjusting circuit to process the output voltage, and the light signal voltage generation circuit combines (namely, cooperates) the fast voltage-adjusting circuit to clamp the output voltage to meet (namely, satisfy) a predetermined value. When the output voltage is processed to meet the predetermined value, the control unit turns on the output side switch unit so the output voltage recovers and a light driving signal is generated. According to the light driving signal, the two-pin point-controlled light emitting diode lamps are operated in a lighting mode. Namely, the two-pin point-controlled light emitting diode lamps are driven by the light driving signal.

The advantage of the present invention is to fast discharge or boost to fast and correctly generate the light driving signal.

BRIEF DESCRIPTION OF DRAWING

FIG. 10 shows a waveform diagram of an embodiment of the light driving signal in accordance with FIG. 8 or FIG. 9 of the present invention.

FIG. 11 shows a waveform diagram of another embodiment of the light driving signal in accordance with FIG. 8 or FIG. 9 of the present invention.

DETAILED DESCRIPTION OF THE INVENTION

Figure 1:
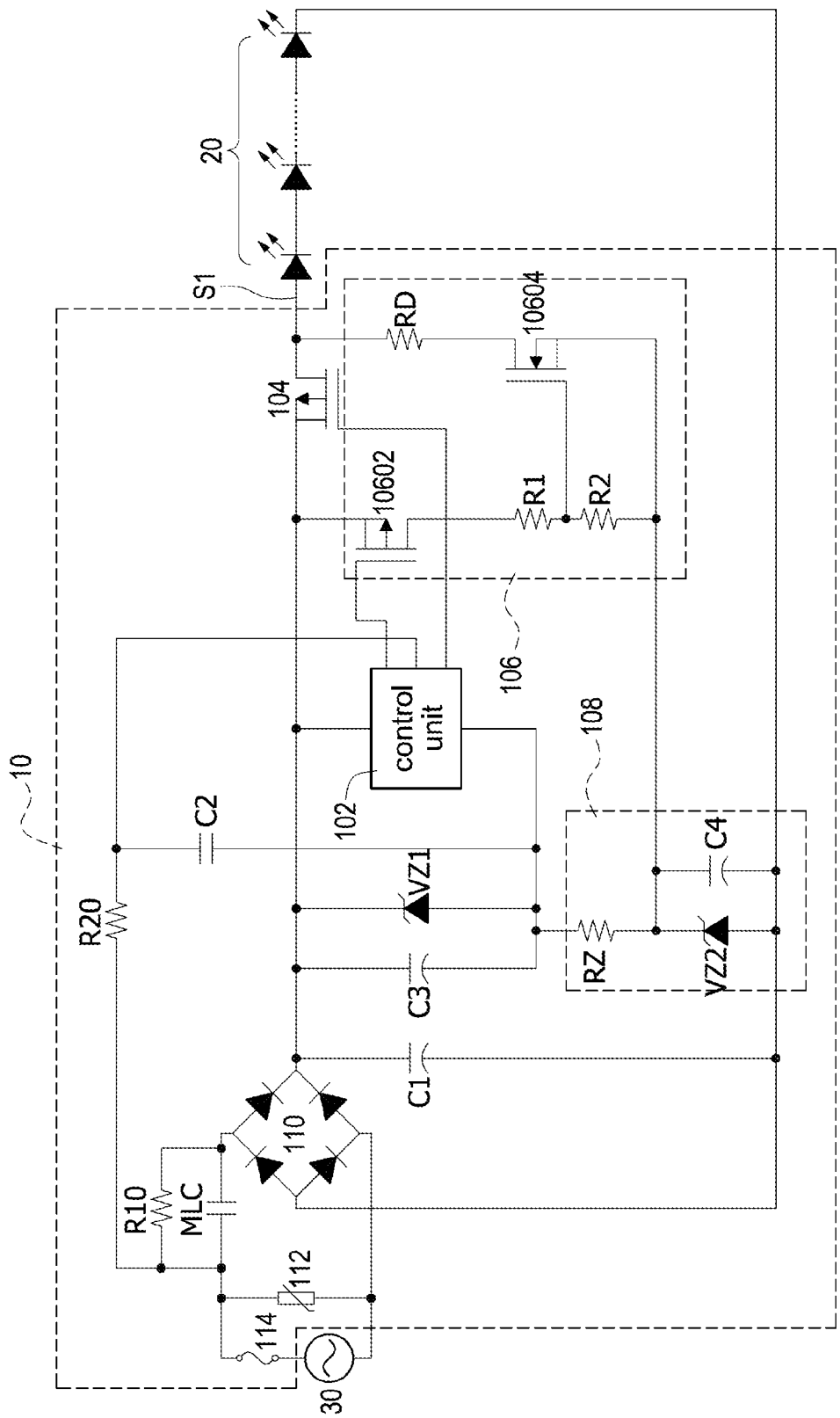
FIG. 1 shows a circuit diagram of the first embodiment of the light emitting diode driving system of the present invention.

FIG. 1 shows a circuit diagram of the first embodiment of the light emitting diode driving system of the present invention. A light emitting diode driving system 10 drives a plurality of two-pin point-controlled light emitting diode lamps 20 and is connected to an alternating current power supply apparatus 30.

The light emitting diode driving system 10 comprises a control unit 102, an output side switch unit 104, a fast voltage-adjusting circuit 106, a light signal voltage generation circuit 108, a first capacitor C1, a second capacitor C2, a third capacitor C3, a control side Zener diode VZ1, a bridge rectifier 110, an input side capacitor MLC, an input side first resistor R10, an input side second resistor R20, a varistor 112 and a fuse 114.

The fast voltage-adjusting circuit 106 is a fast discharging circuit. The fast voltage-adjusting circuit 106 comprises a pull-down resistor RD, a first switch subunit 10602, a second switch subunit 10604, a first resistor R1 and a second resistor R2. The light signal voltage generation circuit 108 comprises a signal generation side Zener diode VZ2, a signal generation side capacitor C4 and a signal generation side resistor RZ.

The output side switch unit 104 receives and sends an output voltage. Namely, the output side switch unit 104 receives the output voltage and then the output side switch unit 104 sends out the output voltage. The output side switch unit 104 is electrically connected to the control unit 102 and the two-pin point-controlled light emitting diode lamps 20. The fast voltage-adjusting circuit 106 is configured to process (namely, decrease) the output voltage. The fast voltage-adjusting circuit 106 is electrically connected to the control unit 102, the two-pin point-controlled light emitting diode lamps 20 and the output side switch unit 104. The light signal voltage generation circuit 108 clamps the output voltage. The light signal voltage generation circuit 108 is electrically connected to the control unit 102, the output side switch unit 104 and the fast voltage-adjusting circuit 106. The first capacitor C1 is electrically connected to the control unit 102, the fast voltage-adjusting circuit 106, the light signal voltage generation circuit 108 and the output side switch unit 104. The fast discharging circuit decreases the output voltage.

The second capacitor C2 is electrically connected to the control unit 102, the fast voltage-adjusting circuit 106, the light signal voltage generation circuit 108 and the output side switch unit 104. The third capacitor C3 is electrically connected to the control unit 102, the fast voltage-adjusting circuit 106, the light signal voltage generation circuit 108, the output side switch unit 104, the first capacitor C1 and the second capacitor C2. The control side Zener diode VZ1 is electrically connected to the control unit 102, the fast voltage-adjusting circuit 106, the light signal voltage generation circuit 108, the output side switch unit 104, the first capacitor C1, the second capacitor C2 and the third capacitor C3.

The bridge rectifier 110 is electrically connected to the control unit 102, the fast voltage-adjusting circuit 106, the light signal voltage generation circuit 108, the output side switch unit 104, the first capacitor C1, the third capacitor C3 and the control side Zener diode VZ1. The input side capacitor MLC is electrically connected to the bridge rectifier 110. The input side first resistor R10 is electrically connected to the bridge rectifier 110 and the input side capacitor MLC. The input side second resistor R20 is electrically connected to the input side capacitor MLC, the input side first resistor R10, the second capacitor C2 and the control unit 102. The varistor 112 is electrically connected to the input side capacitor MLC, the input side first resistor R10 and the input side second resistor R20.

The fuse 114 is electrically connected to the input side capacitor MLC, the input side first resistor R10, the input side second resistor R20 and the varistor 112. The pull-down resistor RD is electrically connected to the output side switch unit 104 and the two-pin point-controlled light emitting diode lamps 20. The first switch subunit 10602 is electrically connected to the output side switch unit 104, the control unit 102 and the light signal voltage generation circuit 108. The second switch subunit 10604 is electrically connected to the pull-down resistor RD, the control unit 102 and the light signal voltage generation circuit 108. The first resistor R1 is electrically connected to the first switch subunit 10602, the second switch subunit 10604, the output side switch unit 104 and the light signal voltage generation circuit 108.

The second resistor R2 is electrically connected to the first switch subunit 10602, the second switch subunit 10604, the output side switch unit 104, the first resistor R1, the pull-down resistor RD, the control unit 102, the two-pin point-controlled light emitting diode lamps 20 and the light signal voltage generation circuit 108. The signal generation side Zener diode VZ2 is electrically connected to the control unit 102 and the fast voltage-adjusting circuit 106. The signal generation side capacitor C4 is electrically connected to the control unit 102, the fast voltage-adjusting circuit 106 and the signal generation side Zener diode VZ2. The signal generation side resistor RZ is electrically connected to the control unit 102, the fast voltage-adjusting circuit 106, the signal generation side Zener diode VZ2, the signal generation side capacitor C4 and the output side switch unit 104.

The control unit 102 controls a conducting state of the output side switch unit 104. When the control unit 102 does not turn on the output side switch unit 104, the control unit 102 controls the fast voltage-adjusting circuit 106 to process the output voltage (namely, to discharge the output voltage to decrease the output voltage), and the light signal voltage generation circuit 108 combines (namely, cooperates) the fast voltage-adjusting circuit 106 to clamp the output voltage to meet (namely, satisfy) a predetermined value. When the output voltage is processed (namely, discharged to decrease) to meet the predetermined value, the control unit 102 turns on the output side switch unit 104 so the output voltage recovers and a light driving signal S1 is generated. According to the light driving signal S1, the two-pin point-controlled light emitting diode lamps 20 are operated in a lighting mode. Namely, the two-pin point-controlled light emitting diode lamps 20 are driven by the light driving signal S1.

Figure 5:
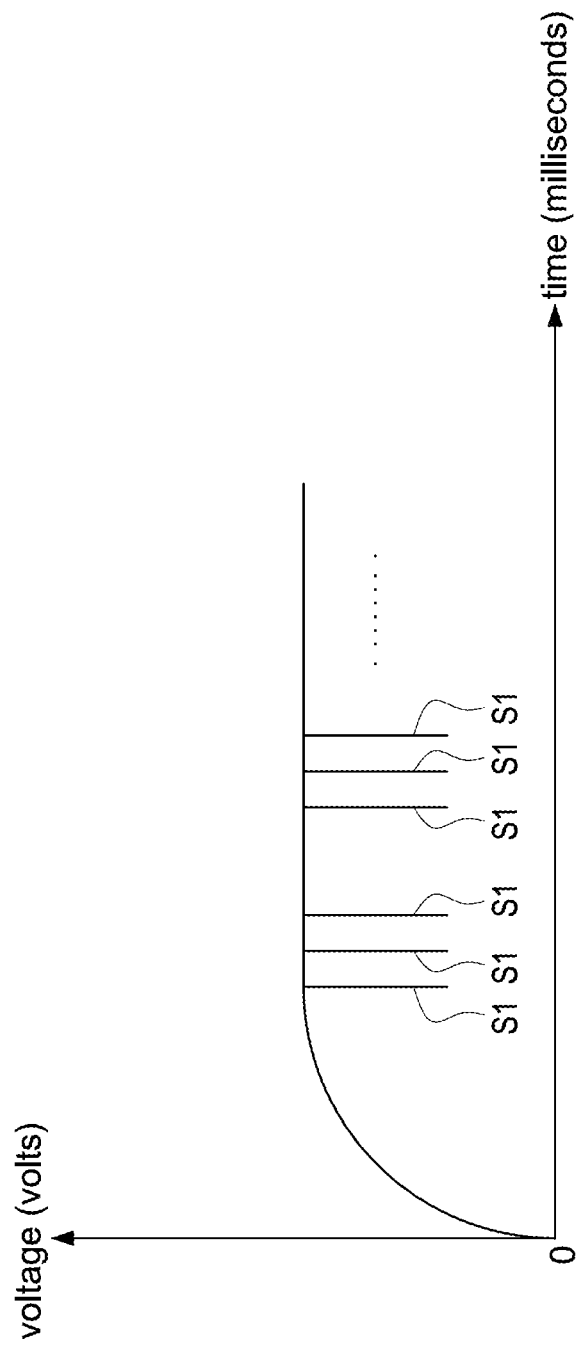
FIG. 5 shows a waveform diagram of an embodiment of the light driving signal of the present invention.
Figure 6:
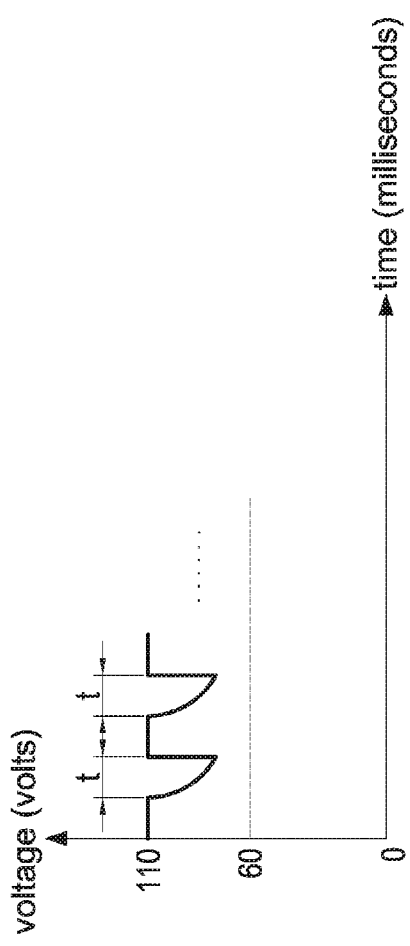
FIG. 6 shows a waveform diagram of an embodiment of the related art light driving signal.

Namely, when the control unit 102 does not turn on the output side switch unit 104, the control unit 102 controls the fast voltage-adjusting circuit 106 and the light signal voltage generation circuit 108 to generate the light driving signal S1. The fast voltage-adjusting circuit 106 and the light signal voltage generation circuit 108 send the light driving signal S1 to the two-pin point-controlled light emitting diode lamps 20 to drive the two-pin point-controlled light emitting diode lamps 20 to light. FIG. 5 shows a waveform diagram of an embodiment of the light driving signal of the present invention.

Moreover, when the control unit 102 does not turn on the output side switch unit 104, the control unit 102 turns on the first switch subunit 10602, so that the second switch subunit 10604 is also turned on. The advantage of this method is to avoid the control unit 102 being unable to provide a high voltage for driving the second switch subunit 10604. Namely, the control unit 102 controls the fast voltage-adjusting circuit 106 to fast decrease a voltage generated by the light signal voltage generation circuit 108 to form a low voltage part of the light driving signal S1.

Moreover, after an alternating current power sent by the alternating current power supply apparatus 30 is processed by the input side capacitor MLC, the bridge rectifier 110, the first capacitor C1, the second capacitor C2, the third capacitor C3, the input side first resistor R10, the input side second resistor R20 and the control side Zener diode VZ1 and so on, the alternating current power is converted into a direct current power. When the light driving signal S1 is not required to generate and is not required to send to the two-pin point-controlled light emitting diode lamps 20, the control unit 102 turns on the output side switch unit 104, so that the direct current power is sent to the two-pin point-controlled light emitting diode lamps 20 to drive the two-pin point-controlled light emitting diode lamps 20. When the control unit 102 does not turn on the output side switch unit 104 (namely, the light driving signal S1 is required to generate and is required to send to the two-pin point-controlled light emitting diode lamps 20), the light signal voltage generation circuit 108 receives the direct current power and generates the light driving signal S1 with the fast voltage-adjusting circuit 106.

The control side Zener diode VZ1 is used to provide the control unit 102 with a driving power. The input side capacitor MLC is used as a load. For example, if the alternating current power is 110 volts and each of the two-pin point-controlled light emitting diode lamps 20 consumes 3 volts, a quantity of the two-pin point-controlled light emitting diode lamps 20 shall be about 36. If the quantity of the two-pin point-controlled light emitting diode lamps 20 is 26 in fact, an excess energy will be absorbed by the input side capacitor MLC.

The output side switch unit 104 is a P-type metal oxide semiconductor field effect transistor. The first switch subunit 10602 is a P-type metal oxide semiconductor field effect transistor. The second switch subunit 10604 is an N-type metal oxide semiconductor field effect transistor.

Figure 2:
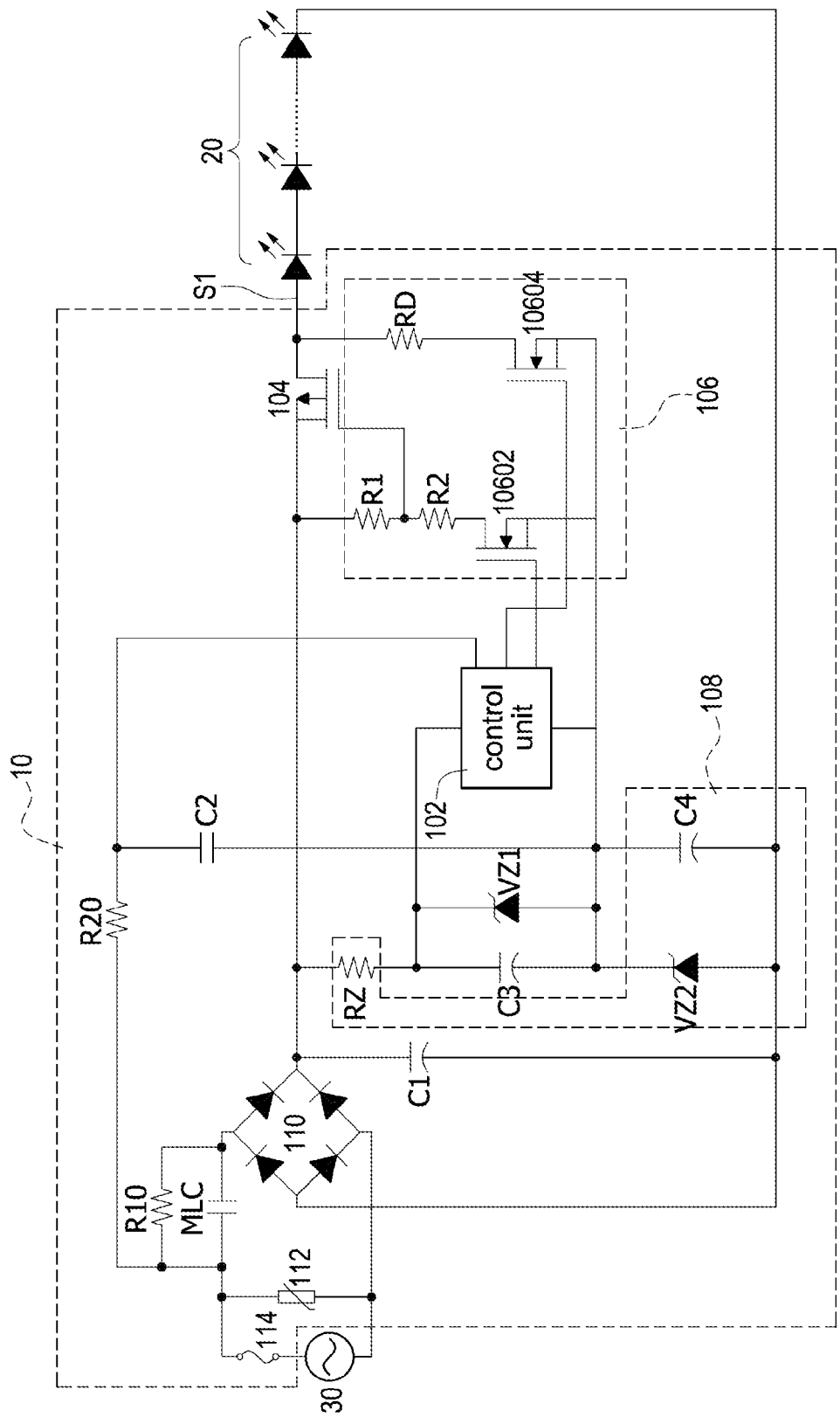
FIG. 2 shows a circuit diagram of the second embodiment of the light emitting diode driving system of the present invention.

FIG. 2 shows a circuit diagram of the second embodiment of the light emitting diode driving system of the present invention. The description for the elements shown in FIG. 2, which are similar to those shown in FIG. 1, is not repeated here for brevity. The output side switch unit 104 is a P-type metal oxide semiconductor field effect transistor. The first switch subunit 10602 is an N-type metal oxide semiconductor field effect transistor. The second switch subunit 10604 is an N-type metal oxide semiconductor field effect transistor.

Figure 3:
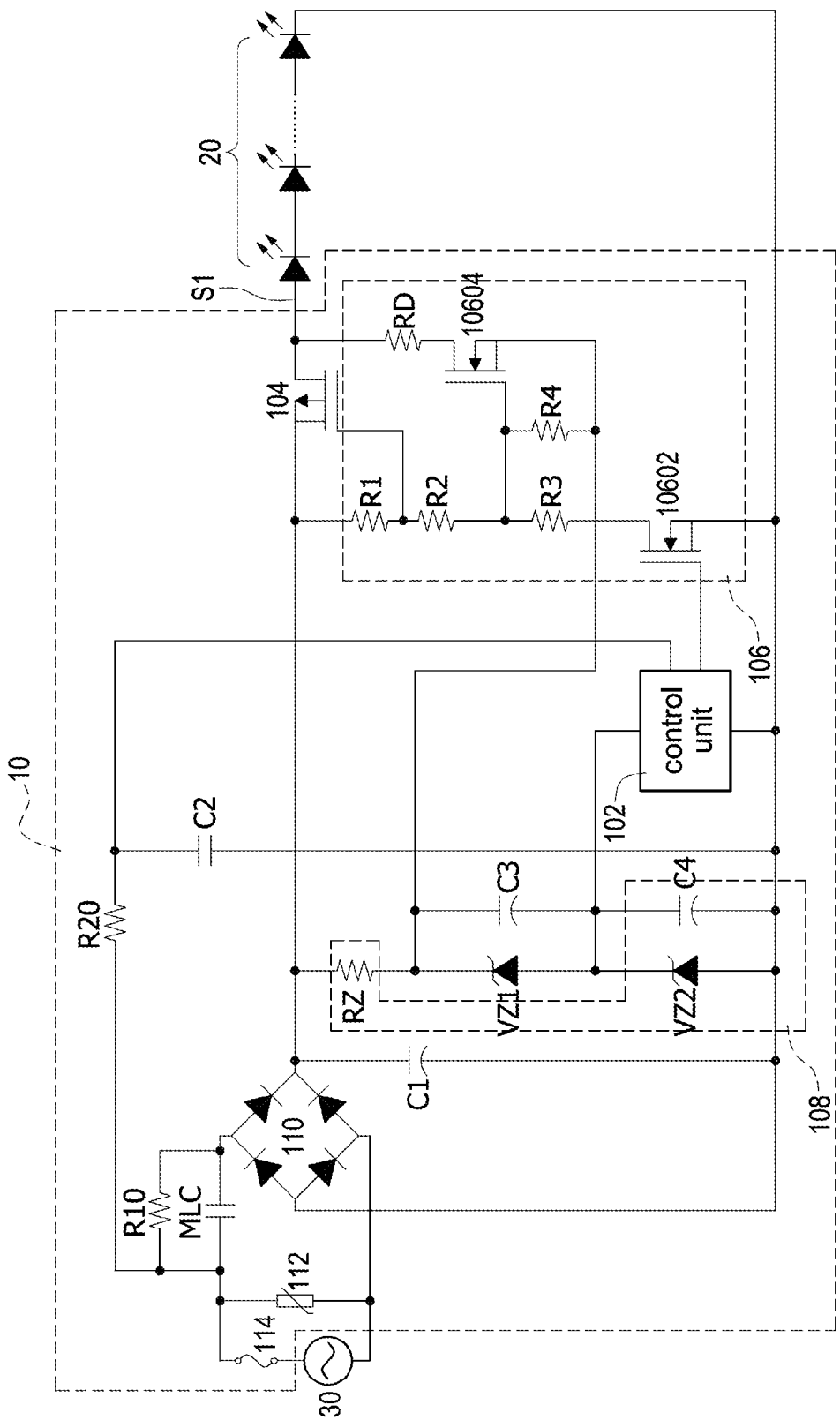
FIG. 3 shows a circuit diagram of the third embodiment of the light emitting diode driving system of the present invention.

FIG. 3 shows a circuit diagram of the third embodiment of the light emitting diode driving system of the present invention. The description for the elements shown in FIG. 3, which are similar to those shown in FIG. 1, is not repeated here for brevity. Moreover, the fast voltage-adjusting circuit 106 further comprises a third resistor R3 and a fourth resistor R4. The third resistor R3 is electrically connected to the first resistor R1, the second resistor R2, the first switch subunit 10602, the second switch subunit 10604 and the light signal voltage generation circuit 108. The fourth resistor R4 is electrically connected to the third resistor R3, the second switch subunit 10604 and the light signal voltage generation circuit 108. The output side switch unit 104 is a P-type metal oxide semiconductor field effect transistor. The first switch subunit 10602 is an N-type metal oxide semiconductor field effect transistor. The second switch subunit 10604 is an N-type metal oxide semiconductor field effect transistor.

Figure 4:
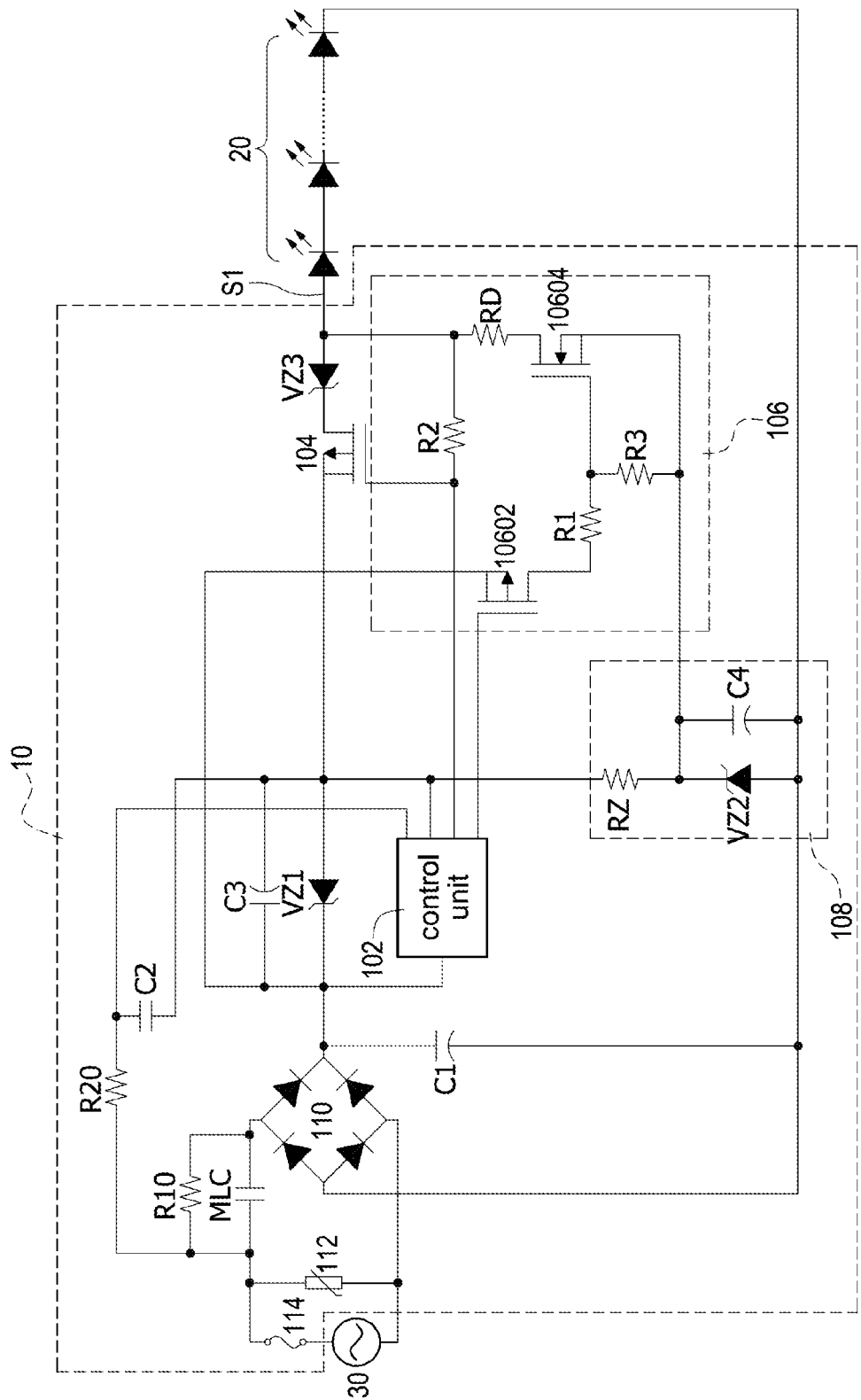
FIG. 4 shows a circuit diagram of the fourth embodiment of the light emitting diode driving system of the present invention.

FIG. 4 shows a circuit diagram of the fourth embodiment of the light emitting diode driving system of the present invention. The description for the elements shown in FIG. 4, which are similar to those shown in FIG. 1, is not repeated here for brevity. Moreover, the light emitting diode driving system 10 further comprises an output side Zener diode VZ3 electrically connected to the output side switch unit 104, the fast voltage-adjusting circuit 106 and the two-pin point-controlled light emitting diode lamps 20. The fast voltage-adjusting circuit 106 further comprises a third resistor R3. The third resistor R3 is electrically connected to the first resistor R1, the second resistor R2, the first switch subunit 10602, the second switch subunit 10604 and the light signal voltage generation circuit 108. The output side switch unit 104 is a P-type metal oxide semiconductor field effect transistor. The first switch subunit 10602 is a P-type metal oxide semiconductor field effect transistor. The second switch subunit 10604 is an N-type metal oxide semiconductor field effect transistor.

Figure 7:
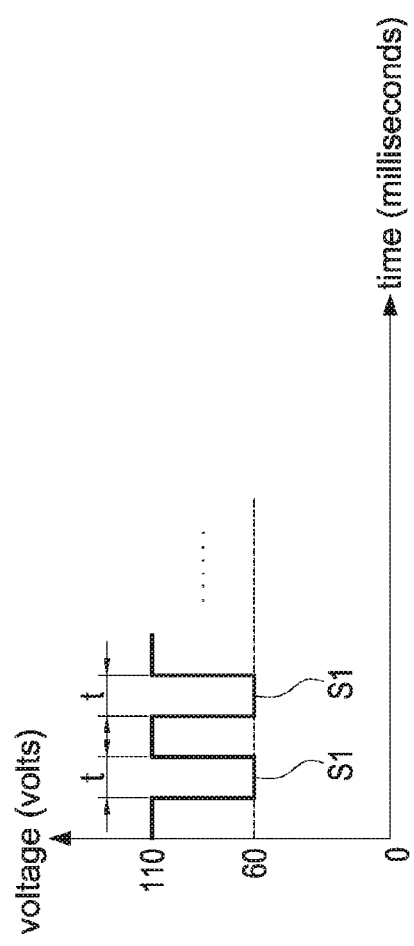
FIG. 7 shows a waveform diagram of another embodiment of the light driving signal of the present invention.

FIG. 7 shows a waveform diagram of another embodiment of the light driving signal of the present invention. Using the fast voltage-adjusting circuit 106 of the present invention and through the voltage-dividing design, in the same output switch conduction time t, the voltage can be discharged smoothly to be the predetermined voltage (60 volts as shown in FIG. 7). Therefore, when the output side switch unit 104 is turned on, the output voltage recovers to 110 volts to form a complete square wave. Namely, the present invention can generate the light driving signal S1 which is the complete square wave and is discharged to the predetermined voltage. The lighting mode of the two-pin point-controlled light emitting diode lamps 20 can be operated and controlled by at least one of the light driving signal S1.

Figure 8:
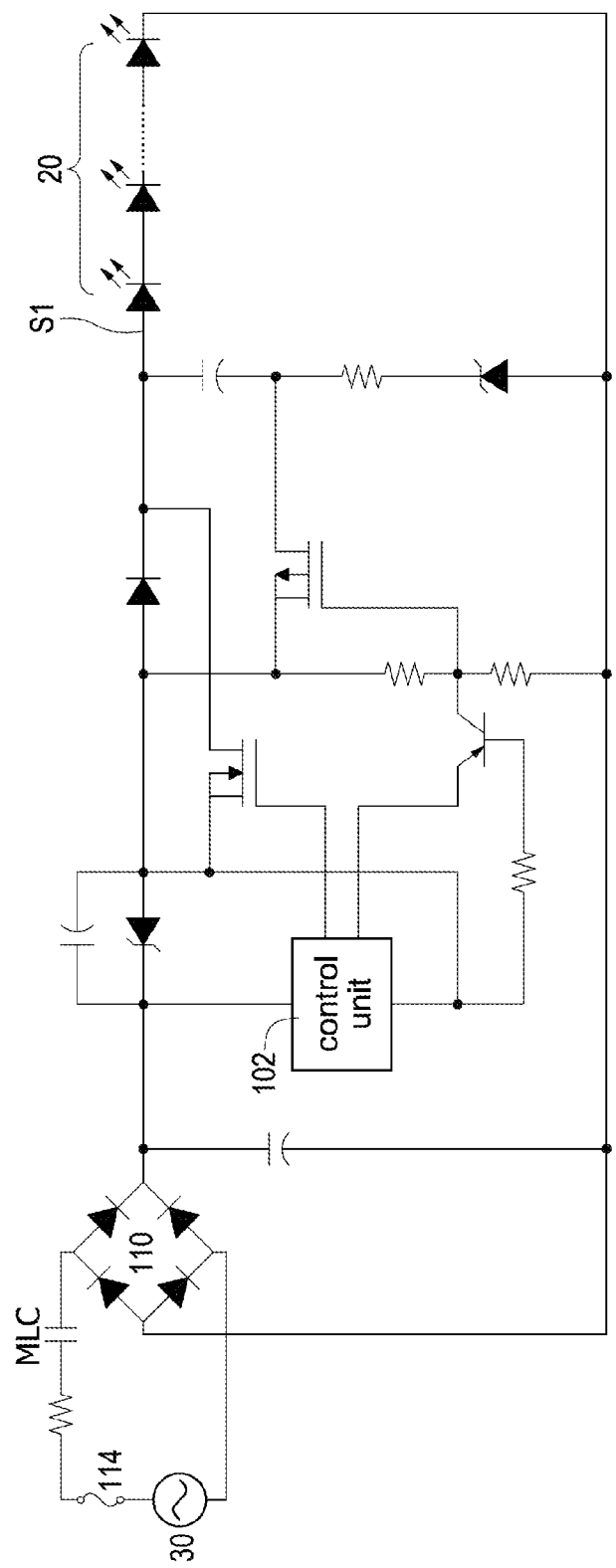
FIG. 8 shows a circuit diagram of the fifth embodiment of the light emitting diode driving system of the present invention.
Figure 9:
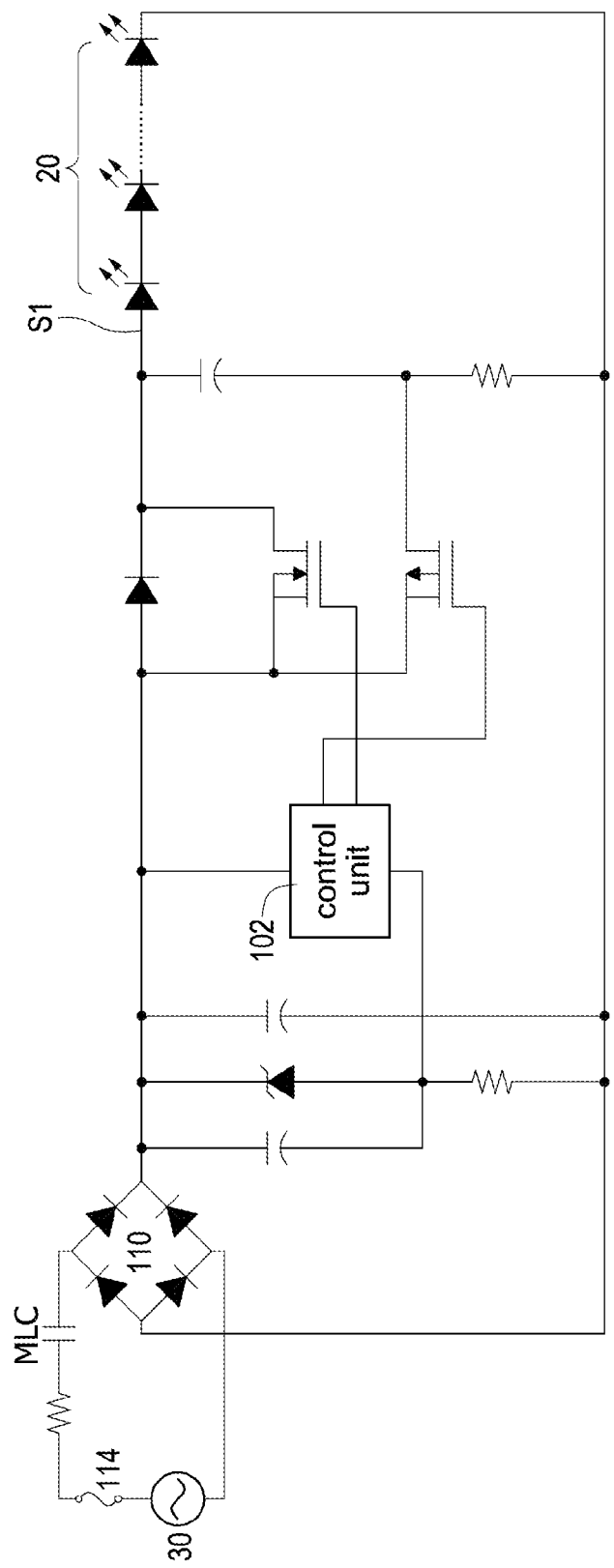
FIG. 9 shows a circuit diagram of the sixth embodiment of the light emitting diode driving system of the present invention.

FIG. 8 shows a circuit diagram of the fifth embodiment of the light emitting diode driving system of the present invention. FIG. 9 shows a circuit diagram of the sixth embodiment of the light emitting diode driving system of the present invention. FIG. 10 shows a waveform diagram of an embodiment of the light driving signal in accordance with FIG. 8 or FIG. 9 of the present invention. FIG. 11 shows a waveform diagram of another embodiment of the light driving signal in accordance with FIG. 8 or FIG. 9 of the present invention. The description for the elements shown in FIG. 8, which are similar to those shown in FIGS. 1-4, is not repeated here for brevity. The description for the elements shown in FIG. 9, which are similar to those shown in FIGS. 1-4, is not repeated here for brevity. FIG. 10 comprises a first voltage VDC+. FIG. 11 comprises a second voltage VDD.

Figure 12:
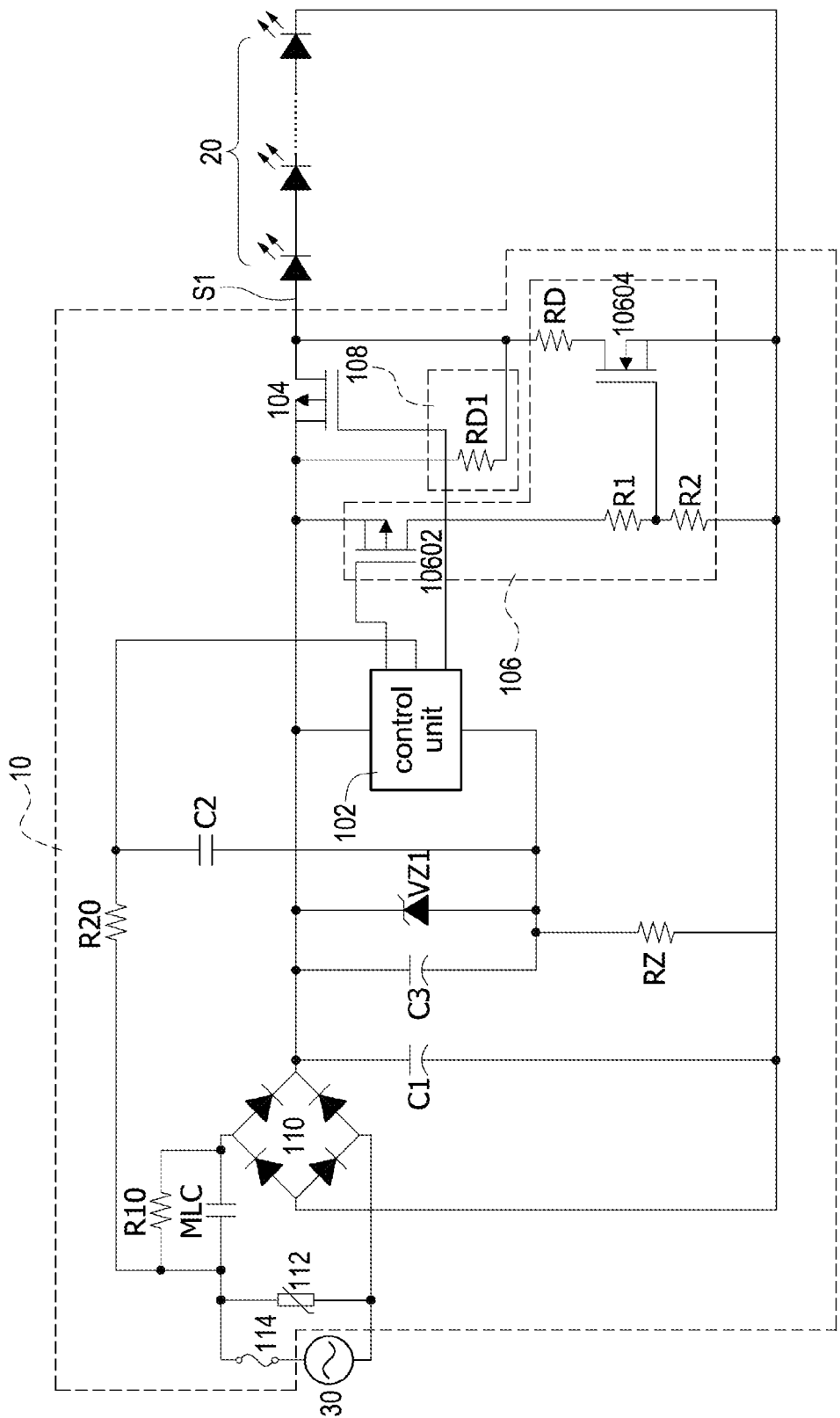
FIG. 12 shows a circuit diagram of the seventh embodiment of the light emitting diode driving system of the present invention.

FIG. 12 shows a circuit diagram of the seventh embodiment of the light emitting diode driving system of the present invention. The description for the elements shown in FIG. 12, which are similar to those shown in FIGS. 1-4, is not repeated here for brevity. Moreover, the light signal voltage generation circuit 108 comprises a voltage dividing resistor RD1. The voltage dividing resistor RD1 is electrically connected to the output side switch unit 104 and the pull-down resistor RD.

Comparing to FIG. 1, the voltage dividing resistor RD1 of FIG. 12 replaces the signal generation side Zener diode VZ2 of FIG. 1 to have the function of the signal generation side Zener diode VZ2 (for example, clamping the output voltage). Namely, the voltage dividing resistor RD1 and the pull-down resistor RD form a voltage dividing circuit to clamp and divide the output voltage. When the second switch subunit 10604 is turned on, the voltage dividing circuit formed by the voltage dividing resistor RD1 and the pull-down resistor RD divides the voltage between two sides of the first capacitor C1 to clamp the output voltage to meet the predetermined value. When the output voltage is processed (namely, discharged to decrease) to meet the predetermined value, the control unit 102 turns on the output side switch unit 104 so the output voltage recovers and the light driving signal S1 is generated. According to the light driving signal S1, the two-pin point-controlled light emitting diode lamps 20 are operated in the lighting mode. Namely, the two-pin point-controlled light emitting diode lamps 20 are driven by the light driving signal S1.

In FIG. 8 or FIG. 9, the fast voltage-adjusting circuit 106 is a fast boosting circuit used to increase the output voltage. When the control unit 102 does not turn on the output side switch unit 104, the control unit 102 controls the fast boosting circuit to boost the output voltage to increase the output voltage, and the light signal voltage generation circuit 108 combines the fast boosting circuit to clamp the output voltage to meet the predetermined value. When the output voltage is boosted and increased to meet the predetermined value, the control unit 102 turns on the output side switch unit 104 to recover the output voltage and to generate the light driving signal S1. According to the light driving signal S1, the two-pin point-controlled light emitting diode lamps 20 are operated in the lighting mode.

The advantage of the present invention is to fast discharge or boost to fast and correctly generate the light driving signal. Moreover, the light driving signal S1 can comprise one pulse wave or a plurality of the pulse waves, and the signal generation side Zener diode VZ2 is used to determine amplitudes of the pulse waves. Because the voltage is decreased in the shorter time, a pulse cycle of the light driving signal S1 can be shorter, so that the light driving signal S1 can comprise more pulse waves to control more two-pin point-controlled light emitting diode lamps 20.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A light emitting diode driving system driving a plurality of two-pin point-controlled light emitting diode lamps, the light emitting diode driving system comprising:
   a control unit;
   an output side switch unit receiving and sending an output voltage, the output side switch unit electrically connected to the control unit and the two-pin point-controlled light emitting diode lamps;
   a fast voltage-adjusting circuit electrically connected to the control unit, the two-pin point-controlled light emitting diode lamps and the output side switch unit; and
   a light signal voltage generation circuit clamping the output voltage, the light signal voltage generation circuit electrically connected to the control unit, the output side switch unit and the fast voltage-adjusting circuit,
   wherein the control unit controls a conducting state of the output side switch unit; when the control unit does not turn on the output side switch unit, the control unit controls the fast voltage-adjusting circuit to process the output voltage, and the light signal voltage generation circuit combines the fast voltage-adjusting circuit to clamp the output voltage to meet a predetermined value; when the output voltage is processed to meet the predetermined value, the control unit turns on the output side switch unit so the output voltage recovers and a light driving signal is generated; according to the light driving signal, the two-pin point-controlled light emitting diode lamps are operated in a lighting mode.

2. The light emitting diode driving system in claim 1, wherein the fast voltage-adjusting circuit is a fast discharging circuit; the fast discharging circuit decreases the output voltage; when the control unit does not turn on the output side switch unit, the control unit controls the fast discharging circuit to discharge the output voltage to decrease the output voltage, and the light signal voltage generation circuit combines the fast discharging circuit to clamp the output voltage to meet the predetermined value; when the output voltage is discharged and decreased to meet the predetermined value, the control unit turns on the output side switch unit so the output voltage recovers and the light driving signal is generated.

3. The light emitting diode driving system in claim 2, wherein the fast voltage-adjusting circuit comprises:
   a pull-down resistor electrically connected to the output side switch unit and the two-pin point-controlled light emitting diode lamps;
   a first switch subunit electrically connected to the output side switch unit, the control unit and the light signal voltage generation circuit;
   a second switch subunit electrically connected to the pull-down resistor, the control unit and the light signal voltage generation circuit;
   a first resistor electrically connected to the first switch subunit, the second switch subunit, the output side switch unit and the light signal voltage generation circuit; and
   a second resistor electrically connected to the first switch subunit, the second switch subunit, the output side switch unit, the first resistor, the pull-down resistor, the control unit, the two-pin point-controlled light emitting diode lamps and the light signal voltage generation circuit.

4. The light emitting diode driving system in claim 3, wherein the fast voltage-adjusting circuit further comprises:
   a third resistor electrically connected to the first resistor, the second resistor, the first switch subunit, the second switch subunit and the light signal voltage generation circuit; and
   a fourth resistor electrically connected to the third resistor, the second switch subunit and the light signal voltage generation circuit.

5. The light emitting diode driving system in claim 4, wherein the light signal voltage generation circuit comprises:
   a signal generation side zener diode electrically connected to the control unit and the fast voltage-adjusting circuit;
   a signal generation side capacitor electrically connected to the control unit, the fast voltage-adjusting circuit and the signal generation side zener diode; and
   a signal generation side resistor electrically connected to the control unit, the fast voltage-adjusting circuit, the signal generation side zener diode, the signal generation side capacitor and the output side switch unit.

6. The light emitting diode driving system in claim 5 further comprising:
   a first capacitor electrically connected to the control unit, the fast voltage-adjusting circuit, the light signal voltage generation circuit and the output side switch unit;
   a second capacitor electrically connected to the control unit, the fast voltage-adjusting circuit, the light signal voltage generation circuit and the output side switch unit;
   a third capacitor electrically connected to the control unit, the fast voltage-adjusting circuit, the light signal voltage generation circuit, the output side switch unit, the first capacitor and the second capacitor; and a control side zener diode electrically connected to the control unit, the fast voltage-adjusting circuit, the light signal voltage generation circuit, the output side switch unit, the first capacitor, the second capacitor and the third capacitor.

7. The light emitting diode driving system in claim 6 further comprising:
   a bridge rectifier electrically connected to the control unit, the fast voltage-adjusting circuit, the light signal voltage generation circuit, the output side switch unit, the first capacitor, the third capacitor and the control side zener diode;
   an input side capacitor electrically connected to the bridge rectifier;
   an input side first resistor electrically connected to the bridge rectifier and the input side capacitor; and
   an input side second resistor electrically connected to the input side capacitor, the input side first resistor, the second capacitor and the control unit.

8. The light emitting diode driving system in claim 7 further comprising:
   a varistor electrically connected to the input side capacitor, the input side first resistor and the input side second resistor;
   a fuse electrically connected to the input side capacitor, the input side first resistor, the input side second resistor and the varistor; and
   an output side zener diode electrically connected to the output side switch unit, the fast voltage-adjusting circuit and the two-pin point-controlled light emitting diode lamps.

9. The light emitting diode driving system in claim 8, wherein the output side switch unit is a p-type metal oxide semiconductor field effect transistor; the first switch subunit is a p-type metal oxide semiconductor field effect transistor or an n-type metal oxide semiconductor field effect transistor; the second switch subunit is an n-type metal oxide semiconductor field effect transistor.

10. The light emitting diode driving system in claim 1, wherein the fast voltage-adjusting circuit is a fast boosting circuit; the fast boosting circuit increases the output voltage; when the control unit does not turn on the output side switch unit, the control unit controls the fast boosting circuit to boost the output voltage to increase the output voltage, and the light signal voltage generation circuit combines the fast boosting circuit to clamp the output voltage to meet the predetermined value; when the output voltage is boosted and increased to meet the predetermined value, the control unit turns on the output side switch unit so the output voltage recovers and the light driving signal is generated.

11. The light emitting diode driving system in claim 3, wherein the light signal voltage generation circuit comprises:
   a voltage dividing resistor electrically connected to the output side switch unit and the pull-down resistor,
   wherein the voltage dividing resistor and the pull-down resistor clamp and divide the output voltage.

\* \* \* \* \*